United States Patent Office 2,837,401
Patented June 3, 1958

2,837,401

SEPARATION OF PLUTONIUM FROM AQUEOUS SOLUTIONS BY ION-EXCHANGE

Jack Schubert, Chicago, Ill., assignor to the United States of America as represented by the United States Atomic Energy Commission No Drawing. Application November 4, 1948
Serial No. 58,367

14 Claims. (Cl. 23—14.5)

This invention relates to a process for the separation of plutonium from an aqueous solution of a water-soluble plutonium salt and especially relates to the separation of plutonium from an aqueous solution of a plutonium salt and salts of fission products obtained by the neutron irradiation of uranium.

In the preparation of plutonium by the neutron irradiation of uranium in a neutronic reactor various methods have been developed for the separation of uranium from plutonium and the fission products. The fission products are chiefly radio-active isotopes of Sr, Y, Zr, Cb, Ru, Te, I, Cs, Ba, La, Ce, and Pr. In other processes the fission products and the plutonium have been separated. In all of these processes there are obtained very dilute solutions of plutonium salts.

It is an object of this invention to provide a process for the separation of plutonium from aqueous solutions of water-soluble plutonium salts.

Another object of this invention is to provide a process for the separation of plutonium from aqueous solutions containing tracer concentrations of plutonium salts.

A further object of the present invention is to provide a process for the separation of plutonium from mixtures of plutonium and fission products, thereby decontaminating the plutonium with respect to fission products and at the same time decontaminating fission products with respect to plutonium.

Still a further object of this invention is to provide a novel composition of matter containing plutonium.

Other objects will be apparent from the following description.

I have discovered a process for the separation of plutonium from aqueous solutions of water-soluble plutonium salts, which comprises contacting the aqueous solution in the presence of an acid of the group consisting of sulfuric acid, phosphoric acid, and oxalic acid, and mixtures thereof, with a synthetic organic anion exchange resin and separating an aqueous phase and resin containing plutonium.

In one embodiment of the present invention, the acid is added to the aqueous solution containing a plutonium salt prior to contacting the aqueous solution with the anion exchange resin.

In a second embodiment, an aqueous solution containing the acid and a plutonium salt is contacted with the resin and an aqueous phase and resin containing plutonium are separated.

In a third embodiment, the resin is contacted with the acid prior to contacting the resin with an aqueous solution containing a plutonium salt.

In a fourth embodiment, the acid is added to the aqueous solution, the resin is contacted with a further quantity of the acid, the resultant aqueous solution and resin are contacted, and an aqueous phase and resin containing plutonium are separated.

In another embodiment of the present invention the plutonium is separated from an aqueous solution by one of the processes of the other embodiments and the initial aqueous solution contains salts of fission products as well as a plutonium salt. In this embodiment the resin containing plutonium and fission products is contacted with an aqueous solution of the acid of this invention in a concentration of 0.1 to 1 M, and an acidic aqueous phase and resin containing plutonium are separated. By means of this embodiment, the amount of fission products associated with plutonium in the resin by anion exchange is considerably reduced.

By the use of an acid of the group consisting of sulfuric acid, phosphoric acid, and oxalic acid, and mixtures thereof, plutonium is converted into an anion complex which exchanges with the anion of the synthetic organic anion exchange resin, the plutonium being removed thereby from the aqueous solution. The complexing of plutonium to form the anion complex may be carried out prior to contacting of the aqueous solution with the resin as exemplified by the first embodiment, or the complexing may be carried out by first contacting the resin with the acid to provide a resin having the anion of such acid, and then contacting the resultant resin with the aqueous solution, as exemplified by the third embodiment of this invention. The fourth embodiment of this invention is a combination of the first and third embodiments. It provides the complexing anion of the acid by the addition of the acid to the aqueous solution containing a plutonium salt and by treating the resin with the acid prior to contacting the resin with the aqueous solution.

In the embodiments wherein the acid of this invention is present in or added to the aqueous solution, the amount of acid is sufficient provided a concentration between 0.0001 and 1 M, preferably between 0.1 and 1 M is obtained. In the embodiments which comprise treating the resin with an acid of this invention a greater concentration of the acid than 0.1 M is preferably used.

Suitable synthetic organic anion exchange resins include the basic resins that provide amino and imino groups. Suitable resins may be obtained by the condensation of formaldehyde with various amines, such as urea, melamine, p-phenylenediamine, and alkylenepolyamines. The preferred type of anion exchange resin of the present invention is the reaction product of a methylol-forming phenol, formaldehyde, and an alkylenepolyamine, especially this type of resin prepared by the process disclosed and claimed in U. S. Patent 2,402,384. "Amberlite IR–4" is a commercial product of the preferred type of synthetic organic anion exchange resin.

The plutonium may be recovered from the anion exchange resin by contacting the resin with a strong inorganic acid, such as hydrochloric acid and nitric acid, in a concentration of 0.3 M or greater, preferably 0.5 M or greater, or by contacting with an acid of this invention, namely, sulfuric acid, phosphoric acid, oxalic acid, and mixtures thereof, in a concentration greater than 1 M. For example, 2 M sulfuric acid may be used for removal of plutonium from the anion exchange resin.

The following examples illustrate the process of the present invention. In all of the examples the resin used was "Amberlite IR–4." The alpha-, beta-, and gamma-activities of the initial solutions and the effluents were determined according to standard radiochemical techniques. The alpha- activity of the solutions, i. e., the activity due to plutonium in the solutions, was obtained in most instances from the aqueous solutions by the following method. A sufficient volume of the solution to be tested is taken to provide a final volume of about 50 ml. Three milliliters of concentrated sulfuric acid and 1.5 ml. of lanthanum nitrate solution containing 1 mg. of La/ml. are added and the mixture is stirred. Eleven milliliters of concentrated hydrofluoric acid is added and the solution is centrifuged for fifteen minutes at 2000 R. P. M. After decantation of the aqueous phase, 30 ml. of 6 N hydrofluoric acid is added to the residue and the mixture is centrifuged for ten minutes. The aqueous phase is decanted and the solid phase is spread uniformly over a platinum foil and dried at 110° C. The resultant foil containing plutonium associated with the lanthanum fluoride carrier is used for the determination of alpha counts/min.

EXAMPLE I

Three grams of anion exchange resin was placed in a small column and 50 ml. of 2% sodium carbonate solution was passed through the bed of resin to convert at least part of it from the hydroxyl form to the carbonate form. The resin was washed with 100 ml. of distilled water. A solution was prepared containing tracer concentrations of plutonium and fission products as nitrates. Three milliliters of this solution was diluted to 100 ml. using 0.5 M oxalic acid. The resultant solution had an alpha-activity of 318 counts/min./50 ml. and a beta-activity of 291 counts/min./0.2 ml. Fifty milliliters of this solution was percolated slowly through the bed of resin taking about six hours. The alpha-activity of the effluent was 17 counts/min./50 ml. Subtracting the background of 9 alpha counts/min./50 ml., it was calculated that 97.5% of the plutonium was removed by the resin, since plutonium was the only alpha-emitter in the initial solution. The beta-activity of the effluent was determined and it was calculated that 88% of the fission products was removed by the resin. The beta-activity of the initial solution and effluent was due to fission products.

EXAMPLE II

Five milliliters of an aqueous solution containing tracer concentrations of plutonium and fission products as nitrates was diluted to 100 ml. with 0.25 M oxalic acid. The resultant solution had an alpha-activity of 192 counts/min./40 ml. Three grams of the anion exchange resin was ground to a size of about 50 mesh and 50 ml. of the aqueous solution was percolated through a bed of this resin at a rate of about 1.7 ml./min. The total beta- and gamma-activities, due to fission products, in the effluent was about 55 counts/min./0.2 ml., compared to total activities in the initial solution of about 770 counts/min./0.2 ml. Thus, 93% of the fission products was removed by the resin. Fifty milliliters of 5% sodium carbonate solution was percolated through the bed of resin at a rate of 0.5 ml./min. Substantially no activity was eluted. A quantity of 1 M hydrochloric acid was passed through the bed of resin and about one-half of the fission products measured by total beta and gamma counts and one-half of the plutonium measured by alpha counts was eluted.

EXAMPLE III

Four grams of the anion exchange resin was shaken with 100 ml. of 0.4 M phosphoric acid to convert at least part of the resin to the phosphate form. About 60 ml. of an aqueous solution, containing plutonium and fission products and having total beta- and gamma-activities of about 214 counts/min./0.2 ml. and an alpha-activity of 296 counts/min./50 ml., was passed through the resin in a 1-cm. column that was 6 cm. long at a rate of 0.7 ml./min. The effluent contained no alpha-activity and a total of beta- and gamma-activities of 111 counts/min./0.2 ml. Thus, 100% of the plutonium and about 65% of the fission products were removed by the resin, i. e., were separated from the aqueous solution by this process. Fifty milliliters of 0.4 M phosphoric acid was passed through the bed of resin, removing no plutonium and 6% of the fission products. One hundred milliliters of an aqueous solution containing 0.2 M phosphoric acid and 0.25 M hydrochloric acid was percolated through the resin and it removed no plutonium and 10% of the fission products. Fifty milliliters of an aqueous solution containing 0.2 M phosphoric acid and 0.5 M hydrochloric acid removed 40% of the plutonium and 25% of the fission products. Additional quantities of the last eluant removed more of the plutonium from the resin. The percentages given for the amounts eluted are based upon the total amount of plutonium and fission products in the initial solution.

EXAMPLE IV

Six grams of the anion exchange resin was shaken with 60 ml. of 0.25 M sulfuric acid to convert at least part of the resin to the sulfate form. After separation of the aqueous phase the resin was washed with water. Four grams of the treated resin was placed in a 1-cm. column having a length of 6 cm. An aqueous solution, containing 10% uranyl nitrate and tracer amounts of plutonium and fission products as nitrates and having total beta- and gamma-activities of 1980 counts/min./0.2 ml. and an alpha-activity of 290 counts/min./30 ml., was percolated through the bed of resin at a rate of 0.55 ml./min. The effluent had total beta- and gamma-activities of 1710 counts/min./0.2 ml. and an alpha-activity of 218 counts/min./30 ml. Thus, 25% of the plutonium and 14% of the fission products were removed by the resin.

EXAMPLE V

Six grams of the anion exchange resin was shaken with 60 ml. of 1 M oxalic acid to convert at least part of the resin to the oxalate form. An aqueous solution containing 10% uranyl nitrate and tracer concentrations of plutonium and fission products as nitrates was prepared. The total beta- and gamma-activities of this solution was 1950 counts/min./0.2 ml. and the alpha-activity was 283 counts/min./30 ml. Fifty milliliters of this solution was percolated through a column of the 6 g. of treated resin at a rate of about 0.2 ml./min. The total of beta- and gamma-activities of the effluent was 1600 counts/min./0.2 ml. and the alpha-activity was 210 counts/min./30 ml., indicating that the resin had removed 26% of the plutonium and 18% of the fission products.

The relatively poor removal of plutonium in Examples IV and V was probably due to the presence of the high concentrations of uranyl nitrate.

EXAMPLE VI

Six grams of the anion exchange resin was converted at least partly to the phosphate form by shaking with 60 ml. of 0.4 M phosphoric acid. An aqueous solution containing plutonium and fission products as nitrates with a pH of about 2 was prepared. This solution had total beta- and gamma-activities of 386 counts/min./0.2 ml. and an alpha-activity of 200 counts/min./50 ml. A 50-ml. sample of this solution was percolated through a bed of 4 g. of the treated resin in a 1-cm. column that was 6.5 cm. long at a rate of 0.33 ml./min., after passing water through the column. The effluent had total beta- and gamma-activities of 255 counts/min./0.2 ml. and an alpha-activity of 12 counts/min./50 ml. Thus, 94% or the plutonium and 34% of the fission products were removed by the resin. Another 50 ml. of the solution was passed through the column and 87.5% of the plutonium and 3% of the fission products were removed from the solution. A third 50-ml. sample of the solution was passed through the column at 0.5 ml./min. and there was no further removal of plutonium or fission products. One hundred milliliters of 0.4 M phosphoric acid and 100 ml. of 1 M phosphoric acid were passed through the column of resin. These solutions removed 29% of the beta- and gamma-activity and 30.5% of the alpha-activity of the initial solution, i. e., the solutions removed 76% of the beta- and gamma-activities and 27% of the alpha-activity that had been removed by the resin. At this point, the resin contained only 9% of the beta- and gamma-activities and 60% of the alpha-activity of the initial solutions. Another 100-ml. sample of the initial aqueous solution was passed through the column. No beta- or gamma-activities were removed, but 97% of the alpha-activity of the solution was removed by the resin.

EXAMPLE VII

Ten grams of the anion exchange resin was contacted with 100 ml. of 1 M phosphoric acid for four hours to convert at least part of the resin to the phosphate form. The solution was decanted and the treated resin was washed with distilled water. To an aqueous solution containing plutonium and fission products as nitrates, phosphoric acid was added to a concentration of 0.5 M. The total beta- and gamma-activities of the solution was 391 counts/min./0.2 ml. and the alpha-activity was 140 counts/min./50 ml. A 50-ml. sample of the solution was percolated through this resin in a column at a rate or 0.55 ml./min., and 86.4% of the alpha-activity and 19.2% of the total beta- and gamma-activities were removed from the solution by the resin. Another 50-ml. sample of the solution was percolated through the same column of resin at a rate of 1 ml./min. None of the beta- and gamma-activities was removed, but 57% of the alpha-activity was removed. A third sample was passed through the resin and no activity was removed by the resin, indicating that the resin's capacity was reached. A 100-ml. quantity of 0.5 M phosphoric acid was passed through the column and the effluent contained 68% of the total beta- and gamma-activities and 43% of the alpha-activity originally removed by the resin. The resultant resin contained only 6% of the total beta- and gamma-activities and 41% of the alpha-activity present in 100 ml. of the initial solution.

EXAMPLE VIII

A sample of the untreated anion exchange resin was washed with water and about 3.5 g. of the resin was placed in a column. An aqueous solution containing 0.5 M phosphoric acid and salts of plutonium and fission products was percolated through the bed of resin as successive 50-ml. portions. Table I below presents the data of the removel of plutonium and fission products by this treatment.

*Table I*

| | $\beta$- and $\gamma$-Activities, counts/ min./0.4 ml. | $\alpha$-Activity, counts/ min./50 ml. | Percent Removal | |
|---|---|---|---|---|
| | | | F. P. | Pu |
| Initial solution | 836 | 237 | | |
| First 50-ml. effluent | 721 | 13 | 13.9 | 94.5 |
| Second 50-ml. effluent | 916 | 71 | 0 | 70 |
| Third 50-ml. effluent | 836 | 95 | 0 | 60 |
| Over-all removal from solution | | | 4.6 | 75 |

A 100-ml. quantity of 1 M nitric acid was passed through the column. The nitric acid solution contained 52% of the alpha-activity and 2% of the total beta- and gamma-activities originally present in 150 ml. of the initial solution. Thus, the nitric acid effluent contained plutonium decontaminated with respect to fission products by a factor of 26.

EXAMPLE IX

Three grams of anion exchange resin previously washed with water was placed in a 1-cm. column that was 3.5 cm. long. An aqueous solution containing 0.0005 M phosphoric acid and salts of plutonium and fission products had total beta- and gamma-activties of 360 counts/min.-/0.5 ml. and an alpha-activity of 143 counts/min./50 ml. The pH of the solution was about 2. Two 75-ml. samples of this solution were passed through the bed of resin followed by a mixture of 29 ml. of the solution and 12 ml. of water. A quantity of 0.25 M phosphoric acid was then passed through the bed and the activities of the effluents were determined. The removal of activities by the resin are presented below in Table II.

*Table II*

| Solution Used | Effluent, ml. | Cumulative Removal | |
|---|---|---|---|
| | | $\beta$ and $\gamma$, percent | $\alpha$, percent |
| Initial soln | 74 | 75.9 | 92.4 |
| Do | 75 | 65.6 | 88.8 |
| Mixture of initial soln. and water | 41 | 63.4 | 88.6 |
| 0.25 M H$_3$PO$_4$ | 84 | 59.7 | 87.3 |

EXAMPLE X

An aqueous solution containing a plutonium salt and about 0.4 M oxalic acid was passed through a bed of 12 g. of the anion exchange resin in a 1.3 cm. column having a bed height of 24 cm. The resin had an average size of 30 mesh. Fifteen liters of the solution was run through the column at 130 gal./ft.$^2$/hr. and each liter of effluent was analyzed. No plutonium was present in 10 l. of the effluent.

EXAMPLE XI

A number of aliquots of 0.4 M oxalic acid solution containing a plutonium salt and having an alpha-activity of 5200 counts/min./25 ml. were contacted with various weights of air-dried anion exchange resin. The weights of resin per 25 ml. of solution ranged from 0.03 to 0.7 g. Analyses of the separated resin showed that in all cases greater than 99% plutonium was removed by the resin.

EXAMPLE XII

A 215-ml. sample of an aqueous solution, containing 5% oxalic acid, i. e., about 0.4 M oxalic acid, and tracer concentrations of salts of plutonium and fission products, was passed through a bed of 1 g. of anion exchange resin at a flow rate of 60 gal./ft.$^2$/hr. The resin was 45–60 mesh and the resin bed was 12 cm. long in a 0.5 cm. column. Then 215 ml. of 10% Al$_2$(SO$_4$)$_3$·18H$_2$O was passed through the column and finally a quantity of 6 M sulfuric acid was percolated through the resin. Table III below presents the activities in the initial solution and the effluents.

*Table III*

| | $\alpha$-Activity | $\beta$-Activity | $\gamma$-Activity |
|---|---|---|---|
| Counts/min. in initial soln | 44.2×10$^3$ | 10.3×10$^6$ | *11.3×10$^3$ |
| Percent in initial soln. effluent | 0.1 | 5 | 1 |
| Percent in aluminum sulfate wash | 0.1 | 88 | 18 |
| Percent in 6 M H$_2$SO$_4$ eluate | 81 | 3.3 | 18.6 |

*Gamma counts reported are for hard gamma.

Thus, the plutonium recovered from the resin had beta- and gamma-decontamination factors of 33 and 5.6, respectively.

EXAMPLE XIII

A quantity of the anion exchange resin averaging 25–30 mesh was treated with two 250-ml. portions of 2 M sulfuric acid to convert the resin to the sulfate form. Sufficient resin was placed in a 2.6-cm. column to provide a bed having a height of 31 cm. Five liters of 5% oxalic acid was passed through the column at a rate of 130 gal./ft.$^2$/hr. and 900 ml. of 2 M sulfuric acid was passed through the column at a rate of 100 gal./ft.$^2$/hr. followed by a water wash. A 4.5-liter aliquot of 5% oxalic acid solution, containing salts of plutonium and fission products and obtained as an eluate in the desorption of plutonium and fission product cations from a cation exchange resin, was passed through the column at a flow rate of 100 gal./ft.$^2$/hr. One liter of 0.25 M sulfuric acid was percolated through the resin bed and it was followed by 1.1 liter of 2 M sulfuric acid. Both sulfuric acid percolations were carried out at a flow rate of 60 gal./ft.$^2$/hr.

The data of the activities of the initial solution and the analyses of the effluents are presented in Table IV.

Table IV

|  | α-Activity | | β-Activity | | γ-Activity | |
| --- | --- | --- | --- | --- | --- | --- |
|  | c./m.[1] | Percent | c./m.[1] | Percent | c./m.[1] | Percent |
| Oxalic acid initial soln | $2.88 \times 10^5$ | 100 | $2.5 \times 10^7$ | 100 | $4.54 \times 10^4$ | 100 |
| Oxalic acid effluent | <500 | <0.2 | $0.48 \times 10^7$ | 19 | $0.25 \times 10^4$ | 5.5 |
| 0.25 M $H_2SO_4$ effluent | 500 | 0.2 | $0.96 \times 10^7$ | 38 | $0.71 \times 10^4$ | 16 |
| 2 M $H_2SO_4$ eluate | $2.25 \times 10^5$ | 78 | $1.18 \times 10^7$ | 47 | $1.16 \times 10^4$ | 26 |

[1] Counts per minute in total solution.

Thus, the eluate contained 78% of the initial plutonium which was decontaminated with respect to beta- and gamma-activities by factors of 2.1 and 3.9, respectively. By the combination of a cation exchange process and this process there is obtained a greater decontamination of plutonium than using either process alone.

Since the preferred type of anion exchange resin eventually disintegrates when used at a temperature above 40° C., it is preferred that the process of this invention be carried out at a temperature below 40° C., such as room temperature.

By the process of this invention, there is obtained a useful composition of matter, namely, an anion exchange resin containing plutonium. When the plutonium content of the composition of matter is sufficiently high, the composition is useful as a fuel rod in a power-producing pile.

The foregoing examples and embodiments of the present invention are not intended to limit its scope, which is to be limited only by the claims which follow.

What is claimed is:

1. A process for the separation of plutonium from an aqueous solution of a plutonium salt, which comprises adding to said solution an acid of the group consisting of sulfuric acid, phosphoric acid, and oxalic acid, and mixtures thereof to provide an acid concentration between 0.0001 and 1 M, contacting the resultant solution with a synthetic organic anion exchange resin, and separating an aqueous phase and resin containing plutonium.

2. A process for the separation of plutonium from an aqueous solution of a plutonium salt, which comprises contacting an aqueous solution of a plutonium salt containing between 0.0001 and 1 M acid of the group consisting of sulfuric acid, phosphoric acid, and oxalic acid, and mixture thereof with a synthetic organic anion exchange resin, and separating an aqueous phase and resin containing plutonium.

3. A process for the separation of plutonium from an aqueous solution of a plutonium salt, which comprises contacting an aqueous solution of a plutonium salt containing between 0.0001 and 1 M acid of the group consisting of sulfuric acid, phosphoric acid, and oxalic acid, and mixtures thereof with an anion exchange resin prepared by the condensation of a methylol-forming phenol, an alkylenepolyamine and formaldehyde, and separating an aqueous phase and resin containing plutonium.

4. The process of claim 3 wherein the acid is phosphoric acid.

5. The process of claim 3 wherein the acid is oxalic acid.

6. A process for the separation of plutonium from an aqueous solution of a plutonium salt, which comprises contacting a synthetic organic anion exchange resin with an acid of the group consisting of sulfuric acid, phosphoric acid, and oxalic acid, and mixtures thereof, contacting the resultant resin with said solution containing a plutonium salt, and separating an aqueous phase and resin containing plutonium.

7. The process of claim 6 wherein the acid is sulfuric acid.

8. The process of claim 6 wherein the acid is phosphoric acid.

9. The process of claim 6 wherein the acid is oxalic acid.

10. A process for the separation of plutonium from an aqueous solution of a plutonium salt, which comprises contacting a synthetic organic anion exchange resin with an acid of the group consisting of sulfuric acid, phosphoric acid, and oxalic acid, and mixtures thereof, adding to said solution of a plutonium salt an amount of said acid to provide a concentration between 0.0001 and 1 M, contacting the resultant resin with the resultant aqueous solution, and separating an aqueous phase and resin containing plutonium.

11. The process of claim 10 wherein the acid contacted with the resin is sulfuric acid and the acid added to the aqueous solution is oxalic acid.

12. A process for the separation of plutonium values from a mixture of plutonium values and fission products values contained in an aqueous solution, which comprises contacting a synthetic organic anion exchange resin with a phosphoric acid solution, adding to said aqueous solution containing a plutonium salt and fission product salts phosphoric acid in an amount to provide a concentration of 0.1 to 1 M, contacting the resin and aqueous solution, separating an aqueous phase from resin containing plutonium values, contacting the resin with 0.1 to 1 M phosphoric acid and separating an aqueous phase from resin containing plutonium values and a reduced amount of fission products values.

13. The process of claim 12 wherein the resin is a resin obtained by the condensation of a methylol-forming phenol, an alkylenepolyamine, and formaldehyde.

14. A process for the separation of plutonium values from a mixture of plutonium values and fission products values, which comprises adding to an aqueous solution containing plutonium nitrate and fission product nitrates oxalic acid to obtain a concentration of from 0.1 to 1 M, contacting the aqueous solution with a synthetic organic anion exchange resin in the sulfate form, separating an aqueous phase and resin containing plutonium values and fission products values, contacting the resin with sulfuric acid having a concentration between 0.1 and 1 M, separating an aqueous phase containing fission products values and resin, contacting the resin with sulfuric acid having a concentration greater than 1 M, and separating resin and an aqueous phase containing plutonium values substantially decontaminated with respect to fission products values.

References Cited in the file of this patent

Jour. of the Amer. Chem. Soc., vol. 69 November 1947, pages 2769–2881, especially pages 2769–2777.